United States Patent [19]

Them et al.

[11] 3,732,518

[45] May 8, 1973

[54] THERMOSTAT WITH MULTI-POSITION SENSING ELEMENT

[75] Inventors: Edward G. Them; Gerald R. Wharton, both of Mansfield, Ohio

[73] Assignee: Therm-O-Disc, Incorporated, Mansfield, Ohio

[22] Filed: July 13, 1972

[21] Appl. No.: 271,400

[52] U.S. Cl. .................................................337/394
[51] Int. Cl. .............................................H01h 37/36
[58] Field of Search.....................337/394, 393, 139

[56] References Cited

UNITED STATES PATENTS 3,306,109  2/1967  Caparone............................337/394
3,282,108  11/1966  Bordeaux et al. ....................337/394

*Primary Examiner*—Harold Broome
*Attorney*—Harold F. McNenny et al.

[57] ABSTRACT

A probe-type thermostat is disclosed in which the probe is mounted for swiveling movement in a manner in which the thermostat calibration is not adversely affected. The probe includes a tube mounted on the thermostat base for swiveling movement about a first center and a rod connected to the thermostat operator for swiveling movement about a second center. The two centers are substantially coincident when the switch operates, and the range of swiveling movement is arranged so that the probe remains substantially aligned with the locus of movement of the second center.

13 Claims, 3 Drawing Figures

PATENTED MAY 8 1973 3,732,518
Fig. 1
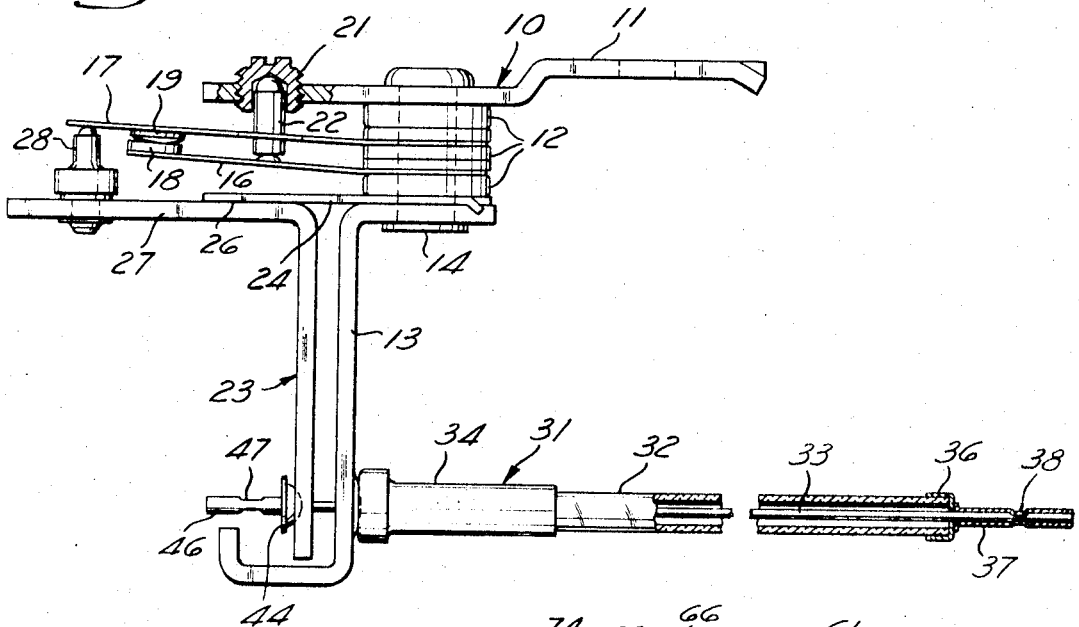
Fig. 3
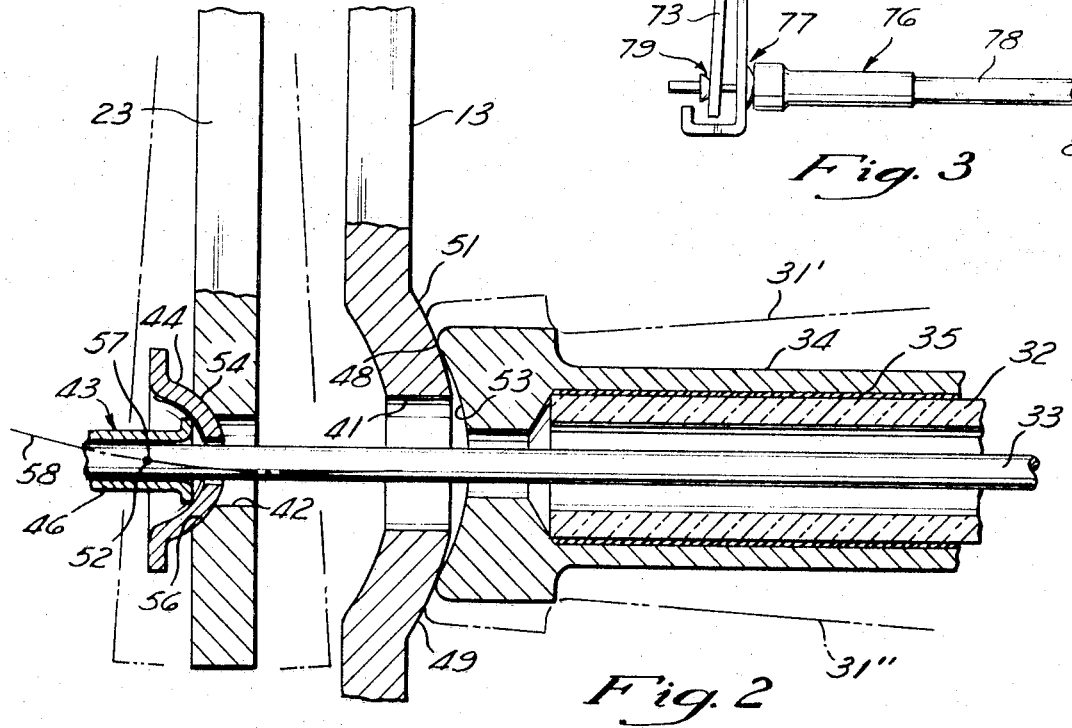
Fig. 2

THERMOSTAT WITH MULTI-POSITION SENSING ELEMENT

BACKGROUND OF THE INVENTION

This invention relates generally to probe-type thermostats and more particularly to a novel and improved thermostat of such type in which the probe assembly can be swiveled with respect to the base without adversely affecting the thermostat calibration.

PRIOR ART

Probe-type thermostats of various types are known in which the probe assembly is formed of two elongated elements having dissimilar coefficients of expansion. In such devices, the differential expansion between the two elements of the probe assembly are utilized to operate a switch mechanism. Insofar as we are aware, the probes of the prior art thermostats have been supported in a fixed orientation with respect to the thermostat body.

SUMMARY OF THE INVENTION

A thermostat incorporating the present invention is provided with a probe assembly which can be swiveled with respect to the thermostat body without adversely affecting the calibration of the thermostat. Consequently, the position of the probe can be adjusted at the time of thermostat installation in a system or thereafter to position the probe in an optimum position with respect to the other elements of the system.

In the illustrated embodiment, the probe assembly includes a tube mounted at one end on the thermostat body and connected to a rod at its other end. The rod is connected to a linkage which operates the switch mechanism. Two embodiments are illustrated. In one embodiment, the switch opens and closes with creep movement and in the other, a snap switch mechanism is provided.

In both embodiments, the tube is connected to the thermostat base with a swivel connection which allows swiveling movement of the tube with respect to the base about a first center. The rod is also connected in each embodiment to the operating linkage with a second swivel connection which allows swiveling movement of the rod with respect to the operating linkage about a second center. The structure of the thermostat is arranged so that the two centers are closely spaced or substantially coincident when the switch opens and closes. Further, the range of swiveling movement is substantially limited so that the probe length remains substantially aligned with the locus of movement of the second center. With such structure, the effect of swiveling movement on the calibration of the thermostat is small and the thermostat does not have to be calibrated to compensate for swiveling movement of the probe to a particular position.

In the illustrated embodiment, the operating linkage is resiliently biased in a direction which places the rod in tension and the tube in compression. A simple swivel structure is used in which the tension of the rod maintains all of the associated swivel elements in engagement. In fact, a sufficient force of engagement is provided to produce enough friction to maintain the probe in its adjusted position.

BRIEF DESCRIPTION OF THE DRAWINGS

FIG. 1 is a side elevation of a probe thermostat in which the probe can be swiveled with respect to the thermostat base and operates a creep-type switch mechanism;

FIG. 2 is a fragmentary section at greatly enlarged scale illustrating the structural detail of the swivel connection for the rod and the tube; and FIG. 3 is a side elevation of an embodiment of this invention in which a snap acting switch mechanism is operated by the swiveled probe.

DETAILED DESCRIPTION OF THE DRAWINGS

Referring to FIG. 1, the first embodiment of a thermostat in accordance with this invention includes a base assembly 10 consisting of a mounting bracket 11, a series of stacked spacers 12, and a probe support bracket 13, all of which are permanently connected together by a rivet 14. Mounted between the spacers 12 in electrically insulated relationship with respect to each other are a fixed contact support 16 and a mobile contact support 17, both of which are formed of resilient material and extend from their mounting end to their contact end. Cooperating fixed and mobile contacts 18 and 19, respectively, are provided which engage when the switch is closed and separate when the switch is open. The position of the fixed contact support arm 16 and in turn the position of the fixed contact 18 is adjustably controlled by a screw 21 threaded through the mounting bracket 11 and an elongated insulated bumper 22. A clearance opening is formed in the mobile contact support arm through which the bumper 22 extends.

The operating linkage of the switch includes an L-shaped link 23 supported by a leaf spring 24. The leaf spring 24 is mounted at one end on the base assembly 10 and is connected at 26 to the operating link 23. The leaf spring 24 performs a dual function of acting as a pivot support for the link 23 and a spring which biases the link 23 in a clockwise direction as illustrated in FIG. 1.

One arm of the link 23 is provided with engageable insulating pusher 28 which is engageable with the free end of the mobile contact support arm 17 beyond the mobile contact 19. Clockwise rotation of the operating link 23 from the position illustrated causes the pusher 28 to deflect the mobile contact support 17 upwardly to cause separation of the two contacts. Anticlockwise rotation of the link 23 allows the two contacts to move back into engagement. The position of the elements when the contacts open and close is determined by the adjusted position of the screw 21.

A probe assembly 31 includes a tube 32 and a rod 33 formed of materials having dissimilar coefficients of thermal expansion. The tube 32 in the illustrated embodiment is formed of glass having a relatively low coefficient of thermal expansion and is provided with a swivel socket member 34 at one end which supports that end of the tube 32 on the probe support bracket 13 for swiveling movement in a manner described in more detail below. Preferably, a suitable cement 35 or adhesive is used to permanently connect the member 34 to the tube 32.

The rod 33 formed of a metal having a substantially higher coefficient of thermal expansion than the tube extends through the tube 32. The rod is connected to the tube at its outer end by a cap 36 and sleeve 37 which is crimped at 38 on the rod so that the outer end of the rod is fixed against movement to the left, as illustrated in FIG. 1, with respect to the adjacent end of the tube. The rod 33 and the sleeve 37 may be connected in any other suitable manner such as by welding or the like.

Referring to FIG. 2, the inner end of the rod 33 extends through the swivel member 34, a clearance opening 41 in the bracket 13, a clearance opening 42 in the link 23 and through a swivel assembly 43 consisting of a swivel member 44 and a sleeve 46. Here again, the sleeve 46 is crimped or otherwise suitably fastened to the inner end of the rod 33 as illustrated at 47. As mentioned previously, the leaf spring 24 resiliently biases the link 23 in a clockwise direction to resiliently urge the rod to the left as illustrated in FIGS. 1 and 2. This places the rod 33 in tension and the tube 32 in compression.

The swivel member 34 is formed with a circular seat or socket 48 which engages a boss 49 formed on the support bracket 13 around the opening 41. The boss 49 is shaped so that its outer surface 51 is a portion of a sphere having a center of curvature at 52. Within the seat 48, the swivel member 34 is formed with a recess 53 having a radius of curvature less than the radius of curvature of the spherical surface 51 so that contact between the boss 49 and the swivel member 34 will occur only along the seat 48.

The swivel member 44 for the rod 33 is formed with a surface 54 having a spherical shape engaging a socket surface 56 formed in the link 23 which is also formed with a spherical shape. The two surfaces 54 and 56 have a center of curvature 57 which is coincident with the center of curvature 52 when the elements are in the position illustrated in full line. The tension in the rod 33 maintains a seated engagement between the swivel member 34 and the surface 51 and also maintains a seated engagement between the surfaces 54 and the socket 56. The force of engagement provided by the tension in the rod 33 is selected so that sufficient friction is produced between the various swivel elements to retain the probe 31 in its adjusted position while allowing the probe to be physically swiveled, for example, to the phantom position 31' or 31''.

When the probe assembly is swiveled from the full line position, both swivels function to allow the tube 32 and the rod 33 to remain in alignment. The swiveling movement of the tube occurs about the center 52 with respect to the bracket 13 and the swiveling movement of the rod occurs about the center 57 with respect to the link 23. When the two centers 52 and 57 are superimposed in space or are coincident, the swiveling movement of the probe assembly does not cause any relative movement between the support bracket 13 and the operating link 23 since the swiveling of both swivels is about the same point in space.

The various elements are arranged so that the operation of the switch at the desired calibration temperature occurs when the two centers 52 and 57 are either coincident or very close to each other since the swivel position or the swiveling movement of the probe assembly under such condition has substantially no effect on the thermostat calibration. In fact, if the switch opens and closes at the moment the two centers are coincident, absolutely no effect on the calibration will result from the swiveling movement as long as the locus of movement of the center 57 is not perpendicular to the length of the probe assembly.

In the illustrated embodiment, the range of swiveling movement is selected so that the probe assembly remains substantially aligned with the locus of movement of the center 57 which is represented by the arc 58. This locus is established by the effective center of the pivotal movement of the link 23 determined by the leaf spring 24. It is recognized that such a leaf spring support structure does not provide a mathematically precise pivot point, but the movement of the link approximates pivotal movement.

With the creep-type thermostat illustrated in FIG. 1, substantially no differential temperature is involved in that the temperature of opening of the contacts is essentially the same as the temperature of closing. Consequently, the thermostat can be calibrated so that both opening and closing temperatures occur when the two centers 52 and 57 are either coincident or very close together.

FIG. 3 illustrates a second embodiment of this invention in which the thermostat is provided with a snap acting switch mechanism. In this embodiment, the switch mechanism again includes a base assembly 61 providing a probe support bracket 62. A fixed contact 63 is supported by a fixed contact support arm 64 cantilever mounted on the base assembly 61. An adjustment screw 66 determines the position of the fixed contact.

A mobile contact 67 is carried by a mobile contact arm 68 supported at one end by the base assembly. A snap element 69 provided with a spring action 71 is connected to the outer end of the mobile contact support and is driven by a pusher 72 carried by the operator link 73. A screw 74 carried by the fixed contact support 64 determines the position of the snap element 69 at a point spaced from the spring 71. Operation of the link 73 in a clockwise direction as illustrated in FIG. 3 carries the snap member over center and causes the mobile contact 67 to move away from the fixed contact 63 with snap action. Anticlockwise movement of the link thereafter allows the spring to snap back through center causing the contacts to snap back to the closed position.

In this embodiment, the probe assembly 76 has the same structure as the probe assembly illustrated in FIGS. 1 and 2 and is provided with a swivel support 77 for the tube 78 on the support bracket 62, and a second swivel connection 79 between the rod 81 and the operator link 73. Here again, the two swivels are proportioned so that their centers are very close when the switch mechanism opens and closes and so that the locus of the center of the swivel 79 is substantially aligned with the length of the probe assembly in all positions of the probe assembly. With such a structure, the swiveling movement does not adversely affect the calibration of the thermostat.

It is recognized that in such a snap acting thermostat a difference in temperature exists between the closing temperature and the opening temperature of the contacts. Such differential temperature requires that the position of the center of the swivel 79 with respect to the center of the swivel 77 be at different locations at the moment the switch opens and closes. Therefore, the mechanism cannot be arranged so that the two centers of the two swivels are coincident on both opening and closing. However, the structure is arranged so that the two centers of the two swivels 77 and 79 are very close together on both opening and closing of the contacts to minimize the effect of swiveling movement of the probe on thermostat calibration. Preferably, the structure is arranged so that the two centers are coincident at a mid position halfway between the opening position and the closing position. With such an arrangement, the effect of the swiveling movement of the probe assembly on calibration is minimized for a given thermostat.

With a thermostat in accordance with the present invention, the thermostat may be accurately calibrated at the time of manufacture, and the swiveling movement of the probe does not adversely affect the calibration of the thermostat so that it does not need to be recalibrated for a particular position of the probe with respect to the base assembly. Therefore, the probe may be swiveled to the exact desired position within the system in which the thermostat is installed to insure accurate operation and such swiveling movement does not materially affect the thermostat calibration.

In the illustrated embodiments, the probe can be swiveled in all directions about the centers. However, in some instances in which swiveling is only desired in a single plane, the spherical surfaces 51 and 54 may be cylindrical and associated sockets shaped to mate with such cylindrical surfaces to provide a pivotal movement about a center axis instead of a center point. It should therefore be understood that the term "swivel" in the broader sense, as used herein, is intended to include such pivotal structure.

Although preferred embodiments of this invention are illustrated, it is to be understood that various modifications and rearrangement of parts may be resorted to without departing from the scope of the invention disclosed and claimed herein.

We claim:

1. A thermostat comprising body means, a switch on said body means including a member movable relative to said body means to cause opening and closing of said switch, a thermally responsive probe assembly including first and second elements movable relative to each other in response to temperature changes, first and second swivels respectively connecting said first element to said body means and said second element to said member for pivotal movement about first and second centers, relative movement between said elements causing relative movement between said centers and operation of said switch, said switch being opened and closed in response to said relative movement between said elements when said centers are substantially coincident whereby pivotal movement of said probe assembly does not materially change the calibration of said thermostat.

2. A thermostat as set forth in claim 1 wherein said swivels permit pivotal movement of said probe assembly with respect to said body means through a predetermined range, said second center moving with respect to said first center along a predetermined locus, said elements being elongated and formed of material having dissimilar coefficients of thermal expansion, said elements being substantially aligned with said locus in all positions within said predetermined range.

3. A thermostat as set forth in claim 2 wherein said first element is a tube, and said second element is a rod extending through said tube and said first swivel.

4. A thermostat as set forth in claim 3 wherein said operator is resiliently biased to place said rod in tension, each swivel including a curved surface and a mating socket, and said tension maintaining said curved surfaces and their associated sockets in engagement.

5. A thermostat as set forth in claim 4 wherein the force of engagement between said curved surfaces and associated sockets produce sufficient friction to maintain said probe assembly in adjusted positions with respect to said body means under normal operating conditions.

6. A thermostat as set forth in claim 5 wherein said curved surfaces are spherical and said probe assembly is supported for full swiveling movement within said range.

7. A thermostat as set forth in claim 6 wherein said member is supported on said body means by a spring which functions to both support said member and provide the resilient bias thereof.

8. A thermostat as set forth in claim 7 wherein said tube is glass and said rod is metal.

9. A thermostat as set forth in claim 8 wherein said switch is a snap switch and said centers are close together both when said switch opens and said switch closes.

10. A thermostat as set forth in claim 8 wherein said switch is a creep switch and said centers are in substantially the same position with respect to each other both when said switch opens and closes.

11. A thermostat comprising body means, switch means on said body means including an operator member movable through a predetermined range of movement to cause switch operation, an elongated temperature responsive probe assembly including two elements having different coefficients of expansion, each element having a mounting end and remote ends, said remote ends being connected together, a first swivel mounting said mounting end of one of said elements on said body means for swiveling movement about a first center, a second swivel mounting said mounting end of the other of said elements on said operator member for swiveling movement about a second center, the spacing between said centers being sufficiently small in all positions of said operator member within said predetermined range so that swiveling movement of said probe does not materially alter the calibration of said thermostat.

12. A thermostat as set forth in claim 11 wherein one element is a tube and the other element is a rod extending through said tube in said first swivel.

13. A thermostat as set forth in claim 12 wherein said operator member is spring-biased in a direction placing said rod in tension and said tube in compression, said first and second swivels each including a spherical surface and a mating socket, and said spring bias operating to maintain engagement between each spherical surface and its associated socket.

* * * * *